US 7,961,741 B2

(12) United States Patent
van Greunen et al.

(10) Patent No.: US 7,961,741 B2
(45) Date of Patent: Jun. 14, 2011

(54) RAPID DISSEMINATION OF BULK INFORMATION TO WIDELY DISPERSED NETWORK NODES

(75) Inventors: Jana van Greunen, Redwood City, CA (US); William San Filippo, III, Los Altos Hills, CA (US); Sterling Hughes, San Mateo, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 237 days.

(21) Appl. No.: 12/257,077

(22) Filed: Oct. 23, 2008

(65) Prior Publication Data

US 2010/0103940 A1 Apr. 29, 2010

(51) Int. Cl.
*H04L 12/28* (2006.01)
*H04J 1/16* (2006.01)
*G08C 15/00* (2006.01)
*G06F 11/00* (2006.01)
*G01R 31/08* (2006.01)

(52) U.S. Cl. ........ 370/400; 370/235; 370/254; 370/338; 709/225; 709/227

(58) Field of Classification Search .......... 370/252–255, 370/328–352, 400–503; 455/328–441; 709/221–227, 238–245
See application file for complete search history.

(56) References Cited

U.S. PATENT DOCUMENTS

| 7,031,288 | B2 * | 4/2006 | Ogier | 370/338 |
| 7,117,264 | B2 * | 10/2006 | Becker et al. | 709/227 |
| 7,394,774 | B2 * | 7/2008 | Calcev | 370/254 |
| 7,512,943 | B2 * | 3/2009 | Hester et al. | 717/177 |
| 7,697,450 | B2 * | 4/2010 | D'Amico et al. | 370/252 |
| 2003/0131129 | A1 | 7/2003 | Becker et al. | |
| 2004/0064556 | A1 | 4/2004 | Zhang et al. | |
| 2008/0133538 | A1 | 6/2008 | Chavez et al. | |
| 2008/0160911 | A1 * | 7/2008 | Chou et al. | 455/7 |
| 2009/0046601 | A1 * | 2/2009 | Nordmark et al. | 370/255 |
| 2009/0154343 | A1 * | 6/2009 | Fitch et al. | 370/221 |
| 2009/0327391 | A1 * | 12/2009 | Park et al. | 709/201 |
| 2010/0014424 | A1 * | 1/2010 | Agrawal et al. | 370/235 |
| 2010/0106831 | A1 * | 4/2010 | Kakivaya et al. | 709/225 |

FOREIGN PATENT DOCUMENTS

EP 1 821 487 A1 8/2007

(Continued)

OTHER PUBLICATIONS

Chang, N., et al. "Revisiting the TTL-Based Controlled Flooding Search: Optimality and Randomization", Annual International Conference on Mobile Computing and Networking, Sep. 26, 2004, pp. 85-99, New York, NY.

(Continued)

*Primary Examiner* — Man Phan
(74) *Attorney, Agent, or Firm* — Buchanan Ingersoll & Rooney PC

(57) ABSTRACT

Bulk information is transferred to nodes in a communication network having a plurality of widely dispersed nodes. The information can be an image, content, or configuration information. The information is uni-cast to a selection of nodes by a central node or server, to seed the information at certain nodes in the network. The information is then distributed by these seed nodes to every other node in the network. A first algorithm selects which nodes should be seeded with information by the central node. A second algorithm distributes information in the network on a query basis.

13 Claims, 4 Drawing Sheets

FOREIGN PATENT DOCUMENTS

WO    WO 2006/105468 A1    10/2006
WO    WO 2008/002295 A1    1/2008

OTHER PUBLICATIONS

Qin, L., et al. "Search and Replication in Unstructured Peer-to-Peer Networks", ACM International Conference on Supercomputing, Jn. 22, 2002, pp. 84-95, New York, NY.

Invitation to Pay Additional Fees, with Partial International Search Report, dated Apr. 16, 2010.

International Search Report from corresponding International Application No. PCT.US2009/005387, dated on Sep. 30, 2010.

* cited by examiner

RAPID DISSEMINATION OF BULK INFORMATION TO WIDELY DISPERSED NETWORK NODES

FIELD OF THE INVENTION

The disclosed invention is directed to a method of transferring bulk information to a plurality of widely dispersed nodes in a communication network. Typically this information might be an image, but it may also be configuration or content information.

BACKGROUND OF THE INVENTION

The transfer of information (firmware/software downloads and upgrades, content downloads, configuration settings, and/or other network status information) is practiced widely in communications networks, where a central node or server transmits information to desired nodes via broadcast or unicast messages. The messages are transmitted either on a scheduled or unscheduled basis. A network node can also request a download at any time. In the current state of the art, the communication sessions are set up in a point-to-point or point-to-multipoint mode to facilitate the transfer of information. In networks with limited bandwidth and a large number of widely dispersed nodes, the unicast method is punitive in terms of bandwidth and network resources, since a separate message is sent to each node. The broadcast mode can be more efficient, but it ties up the network for a considerable period, since all nodes have to listen to the central node at the same time in order to receive the desired information. The transfer of information to each requesting node may demand considerable time and bandwidth resources, possibly disrupting normal network operations.

SUMMARY OF THE INVENTION

The disclosed invention overcomes these limitations by means of algorithms for rapidly dispersing bulk information among the network nodes via a select set of network nodes, or "seeds", without interfering with the normal operations of the network. Several exemplary embodiments of the invention are described herein, including one that involves image transfer to network nodes in a wireless utility network.

The disclosed technique is tailored to spread information to every node in the network. A central server, such as a back office server (BOS), starts the process by instructing the nodes, individually, to look for a certain piece of information. The information is designated by a name as well as a length (typically its byte size).

A "seed selection" process by the BOS involves an algorithmic method by which a set of nodes in the network are selected as its surrogates to implement the dissemination of information to desired nodes in the network, which could be all of the nodes in the network.

The seed selection algorithm's goal is to pick seeds that will speed up the remainder of the bulk transfer to nodes. The nodes can obtain the information being disseminated from a direct neighbor. Thus a good seed selection algorithm may select seeds that have a large number of neighbors and seeds that are distributed geographically across the network so that the information transfer starts uniformly across the network. A secondary goal of the seed selection algorithm is to avoid disruption of normal packet routing traffic within the network. There are many graph-theoretic algorithms that can be deployed to select a set of nodes that are not adjacent to each other and dispersed over the area of the network. One example of such is disclosed in Svaricek F., "An Improved Graph-Theoretic Algorithm for Computing the Structure at Infinity of Linear Systems", Proceedings of the 29$^{th}$ Conference on Decision and Control, Honolulu, Hi., December 1990, pp 2923-2924. The technique of the present invention is specially suited for dealing with seed selection in a widely dispersed network with ongoing packet traffic, and aimed at networks having limited resources (bandwidth, for example). Once implemented, the technique can be generally applied to many different types of networks.

A simple algorithm used for seed selection and distribution is described in one embodiment. The algorithm selects a certain percentage of nodes as seed nodes. Each candidate seed node is randomly chosen from the total pool of nodes. The candidate node is then evaluated according to its number of neighbors, the link quality to each neighbor and also its importance in the network routing process. In one implementation, a candidate seed node is only chosen as a seed node if 1) it has more than l neighbors, 2) it has at least m neighbors with good point-to-point link quality, and 3) it is not used by more than n of its downstream neighbors for routing. Once selected, the BOS arranges for download of the bulk information via unicast or broadcast modes to the seed nodes.

The central server or the BOS then sends out messages to nodes in the network that a certain type of information (name, size) is available to them for download. The nodes enter a "finding the information" mode in which they send out "find" queries to their directly connected neighbors to determine whether the information is anywhere in the local neighborhood. At first a node only sends the query to its k best neighbors (e.g., those with the best link quality). The neighbors with best link quality are queried first because it is much better to obtain a large amount of information over a good link (fewer retries, less interference, etc). Also, querying only n neighbors at a time reduces the number of queries that go out to find the information, especially if the information has not spread to a geographic area near the node. After an established period of time, if the designated information is not found, nodes decrease the rate at which they query their neighbors and query a larger set of neighbors. This is done to account for the possibility that nodes may form a clique. That is, for a group of k+1 nodes, each node in the group may have the other k nodes as their best neighbors. In such a situation, they might never ask other nodes for the information and thus might never obtain it, unless there is a method for expanding the search.

Once the information is found at a neighbor node, it is the responsibility of the node acquiring the information to "pull" the information from its neighbor in chunks. The node sends an X byte query, e.g. 512 k bytes, for the information at offset Y. The node waits a preset time, e.g. 2 seconds, between downloading each chunk. The download rate is chosen to be slower than it need be, to ensure that there is enough bandwidth for other traffic in the network. If the node serving the information disappears at any time, the acquiring node goes back to finding a node with the information. The fact that it is in the middle of a bulk transfer is also persisted to flash or other non-volatile memory. If the node reboots or loses power, it can continue to find the information when it reboots. In one embodiment, the rebooted node may only look for the balance of the information that it still needed to download at the time of its outage.

Networks with different access schemes may adopt different transmit modes that are unique to the access scheme. For example, in a frequency-hopping spread spectrum (FHSS) network, the seed nodes with the information may need to separately transmit information to each of a number of their neighbors. In another embodiment, suitable MAC-layer support may be added to the FHSS network protocol to synchronize nodes to one channel (if more than a certain number of nodes are interested in the piece of information). A beaconing technique can be used to place serial blocks of the information in one channel from which all nodes listening to that channel may retrieve the information.

DETAILED DESCRIPTION

The invention described herein is designed to disseminate information, in a rapid and efficient manner, to all of the nodes in a network, or any desired subset of the nodes. The applicability of the distribution technique is not limited to any particular type of information. Thus, for example, the information may be configuration data, e.g., settings for operating parameters and protocols of the nodes, content to be stored in the nodes, or software images, namely complete copies of the software stored in the nodes. To facilitate an understanding of the invention, it is described hereafter with reference to the bulk downloading of an image to the nodes of a network. It will be appreciated, however, that the principles described herein are equally applicable to the dissemination of other types of information.

Figure 1:
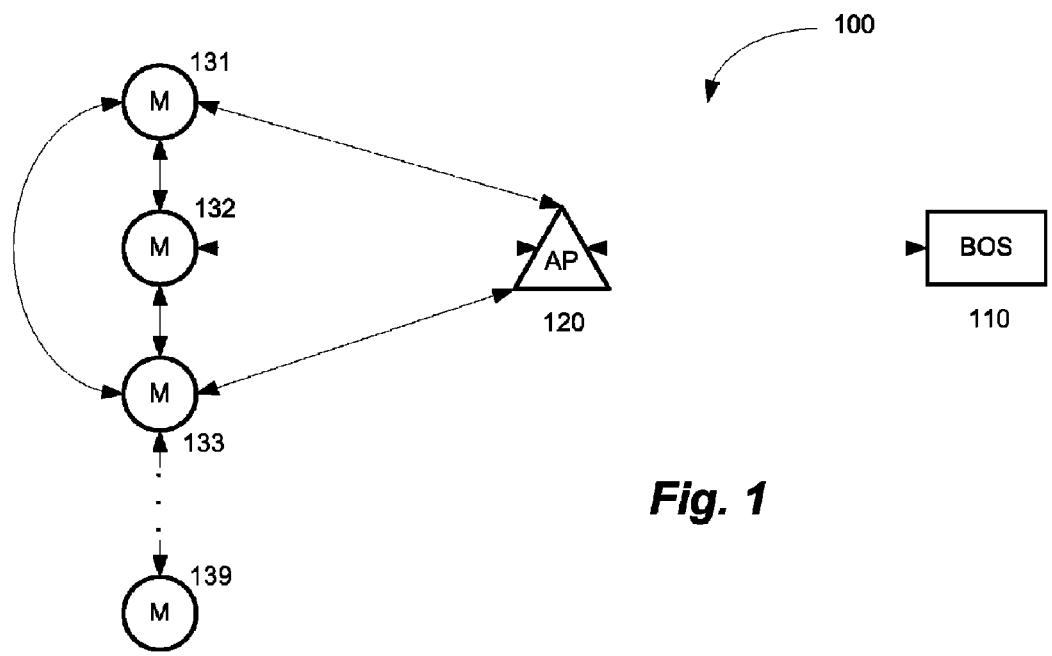
FIG. 1 is a schematic diagram of a first network configuration in which the invention can be implemented.
Figure 2:
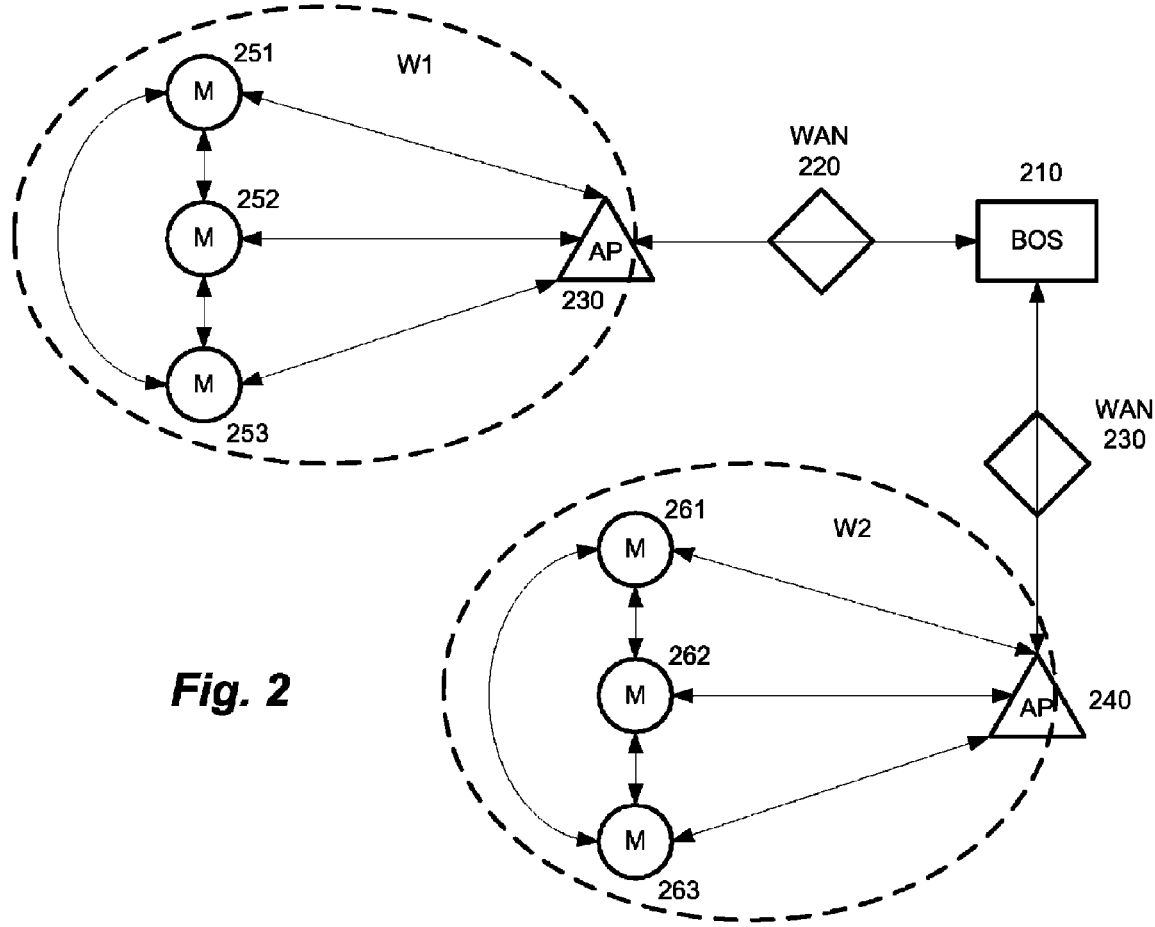
FIG. 2 is a schematic diagram of a second network configuration in which the invention can be implemented.

An exemplary embodiment of bulk image download is presented for two cases as shown in FIG. 1 and FIG. 2. FIG. 1 is a generic network 100 with a plurality of nodes. A central server (also referred to as Back Office Server or BOS) 110 has two-way communications with a network 100 having a plurality of nodes 131, 132, 133, . . . 139, either directly or via a gateway, or access point, 120. Normally, any of the nodes might seek access to the BOS 110 via the access point 120, by routing packets in the network through one or more neighbor nodes (and in some cases directly). In accordance with an aspect of the invention, bulk image transfer in a network environment having a plurality of nodes is accomplished by selecting a set of strategically located seed nodes through which the bulk image transfer to all the nodes is accomplished rapidly without consuming valuable network resources (for example: bandwidth) and without disrupting ongoing normal operations.

FIG. 2 depicts the case of multiple wireless networks. Wireless network W1 is connected to a central server (BOS) 210 via a wide-area network (WAN) 220. The nodes 251, 252, 253, . . . of the wireless network W1 maintain two-way access to the BOS via one or more gateways 230. In certain embodiments, the nodes may have a direct connection to the BOS 210.

Similarly, nodes 261, 262, 263, . . . of a wireless network W2 maintain two-way access to the BOS via WAN 230 and one or more gateways 240. In certain embodiments, the nodes may have a direct connection to the BOS 210. In the case of a wireless utility network, the nodes 251, 252, 253, . . . , 261, 262, 263 . . . might be endpoints that are each associated with a utility meter M.

Figure 3A:
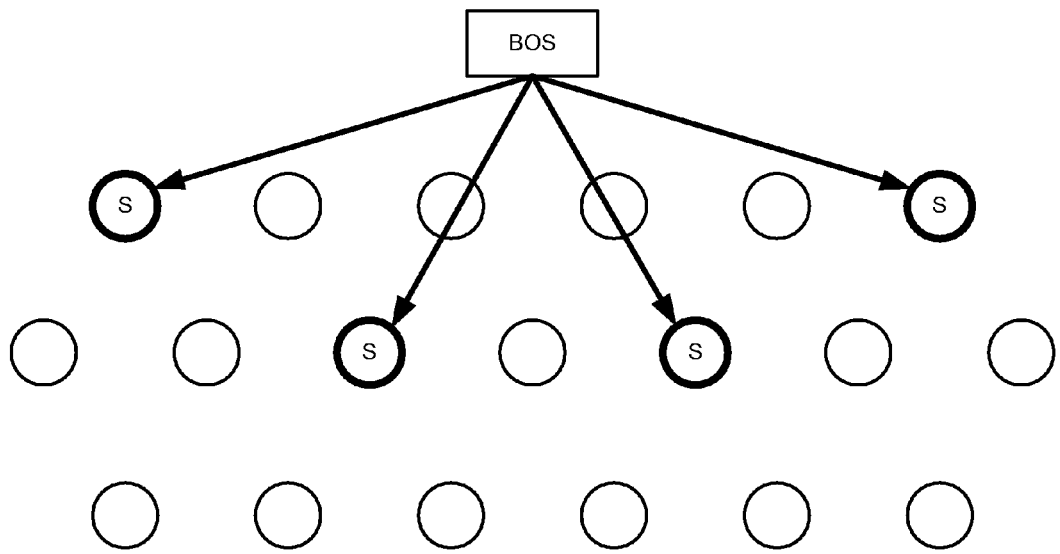
FIGS. 3a and 3b depict the two phases of a bulk information transfer to all nodes of an exemplary network.
Figure 3B:
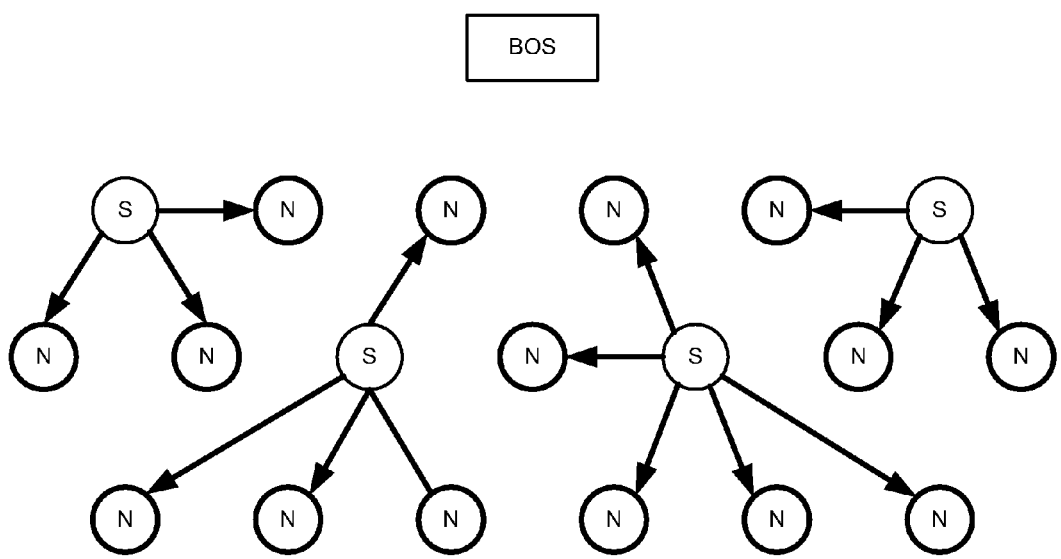

The technique for transferring the image to all of the nodes in networks of the type illustrated in FIGS. 1 and 2 involves two primary phases, represented in FIGS. 3a and 3b. For ease of illustration, access points and WANs are not depicted in these representations. In the first phase, depicted in FIG. 3a, certain nodes of the network are selected as seed nodes S, and the image is transferred from the BOS, or a resource associated with the BOS, to these seed nodes. In the second phase, shown in FIG. 3b, the other nodes N of the network are informed that there is an image available for them, and they are instructed to retrieve the image. In response, these other nodes N locate a seed node S that contains the image, either directly or through a neighboring node, and acquire the image from the seed node.

Initial image seeding can be done in several ways. Two examples are graph partitioning, and vertex degree & geographic info. In graph partitioning, a graph is divided into roughly equal subsets. There are several well-known algorithms for partitioning a graph into roughly equal subsets. For example, the Kernigan-Lin algorithm, or a variation thereof, can be employed. Once the graph has been partitioned, the image can be loaded onto a set of highest degree nodes in the partition. Highest degree is determined by a metric of the number of downlink neighbor nodes using the node of interest for routing and packet forwarding.

For vertex degree and geographic info, instead of partitioning the graph by connectivity, it is partitioned first by geography, and the image is loaded onto one or more nodes in each geographic area with the highest degree. "Degree" in this case is a metric for rating a node in a network in terms of its accessibility.

The seeding algorithm can be based on either of the above approaches, depending on the geographic distribution of the network and how the nodes are distributed within the network.

Once seeding of the selected nodes with the image has occurred, the BOS server alerts all network nodes, or some designated subset thereof, of the availability of "image zzz of size X bytes". This command can be unicast to each node, or it can be combined with the configuration process that happens in the normal routing advertisements and network registration acknowledgements to all nodes that participate in the network. These recipient nodes then send out "find" queries to their directly connected neighbors to determine whether the image is present in their local neighborhood. At first, a node might only send the query to a limited number of its best neighbors (five for example). The "best" neighbor selection by each node may be based on its path and link costs, reliability, and other criteria that is used to support the node for packet routing, reception, and other network functions. The best neighbors can be queried first because it may be better to obtain the image from a neighbor with whom a good connection has been established (resulting in fewer retries, less interference, conservation of network bandwidth for neighbors, etc.) and also because the querying of every neighbor adds more traffic to the network. This querying is done at a certain frequency (for example: 5 queries per minute). After a time, if the image is not found, nodes decrease the rate at which they query their neighbors and query a larger set of neighbors. This avoids the formation of cliques (where the 5 best neighbors are all each other's 5 best), and forces the nodes to search beyond their most immediate neighbors.

Once the image is found on a neighbor, it is the responsibility of the node that is acquiring the image to "pull" the image from its neighbor in chunks. A "chunk" is a serial piece of the bulk information whose size, in bytes, is typically defined by the node that is pulling the information. In some cases, the size of the chunks may be defined by the sending node.

There are many ways of accomplishing the image retrieval. For example, to minimize impact on network traffic, the nodes can pull the image slowly to ensure that there is enough bandwidth for other traffic in the network. The objective here is not to get the image as fast as possible, but to get it from a good neighbor to reduce traffic and interference in the network. If the node that is providing the image disappears from the network at any time, the requesting node goes back to searching for the image until it finds another node with the image.

Figure 4:
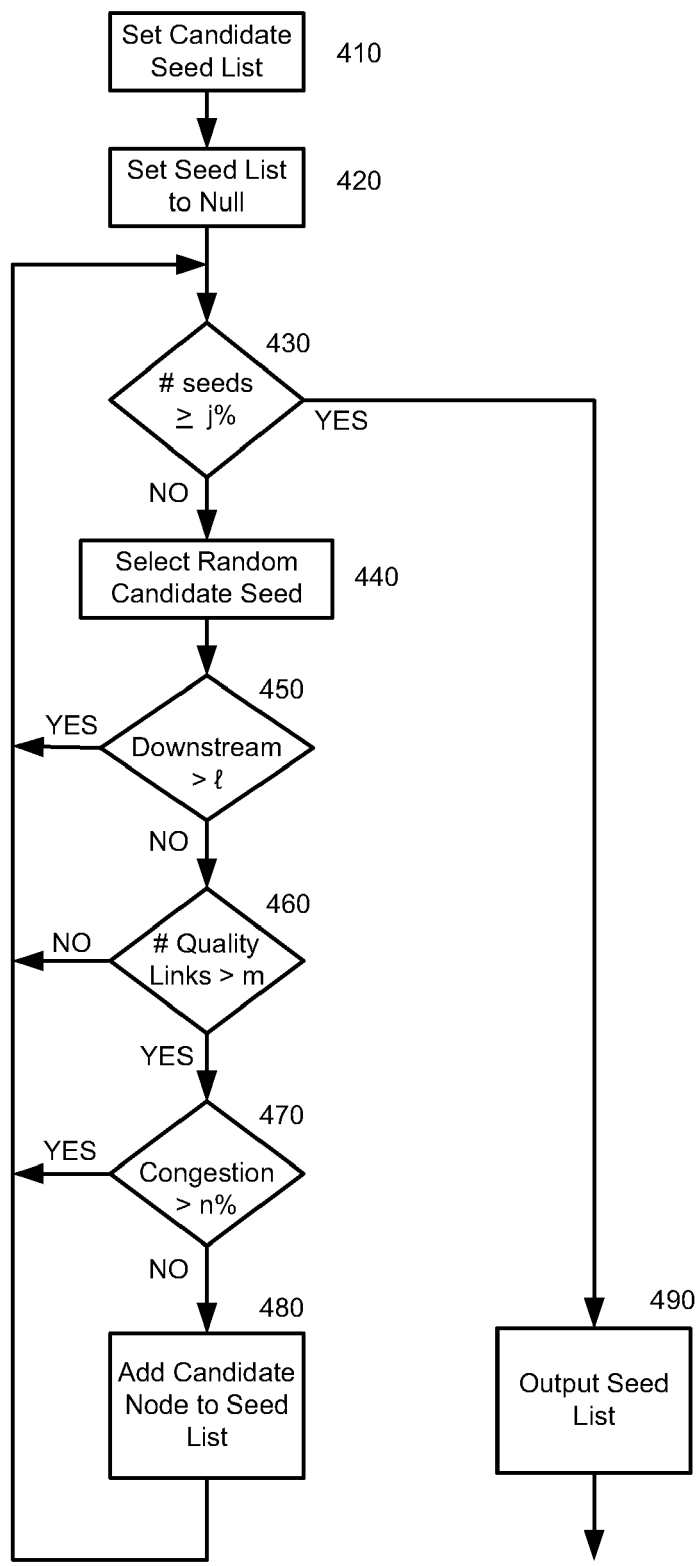
FIG. 4 is a flowchart of a procedure for selecting seed nodes.

FIG. 4 illustrates a flow chart of a procedure that can be used to select the seed nodes that the BOS can then use for implementing bulk image transfer. Referring to the steps depicted therein:

Step 410: Initially, a candidate seed list is set to all deployed nodes in the network.

Step 420: The output seed list is initialized to null.

Step 430: A check is made to see if the number of seeds in the output seed list has reached a threshold of a configurable value j % of all of the nodes. If the answer is YES, then the process jumps to step 490 to return the output seed list, and the process is terminated.

Step 440: If the answer is NO, a candidate seed node is randomly selected from the candidate seed list.

Step 450: A database is analyzed to determine how many downstream nodes in the network use the selected node as an upstream node to seek egress to an access point. A determination in made whether the number of downstream nodes using the selected node is greater than a configurable threshold l. If the answer is YES, the process reverts to step 430. Thus, if the selected node handles a relatively high amount of traffic to the access point, it is not used as a seed node, to minimize disruption of normal network traffic.

Step 460: If the answer is NO, an analysis is performed to see if the number of neighbor nodes of the candidate seed node having a quality link to the candidate seed node is greater than a configurable value m. A metric for determining a quality link can be a packet delivery success rate better than 80% (or some other suitable threshold). If the answer is NO, the process reverts to step 430.

Step 470: If the answer is YES, traffic congestion statistics of the candidate seed node are analyzed to check if its congestion level is greater than a configurable level of n %. If the answer is YES, the process reverts to step 430. If the answer is NO, the process moves to step 480.

Step 480: Having met all of the criteria for selection, the candidate seed node is added to the output seed list, and the process reverts to step 430.

In certain embodiments, different values of thresholds can be chosen and utilized in the algorithm. For example, threshold values of j=3%, l=10, m=50, n=50% form one set. Empirical results can be used to determine the best set of values for any given environment.

Figure 5:
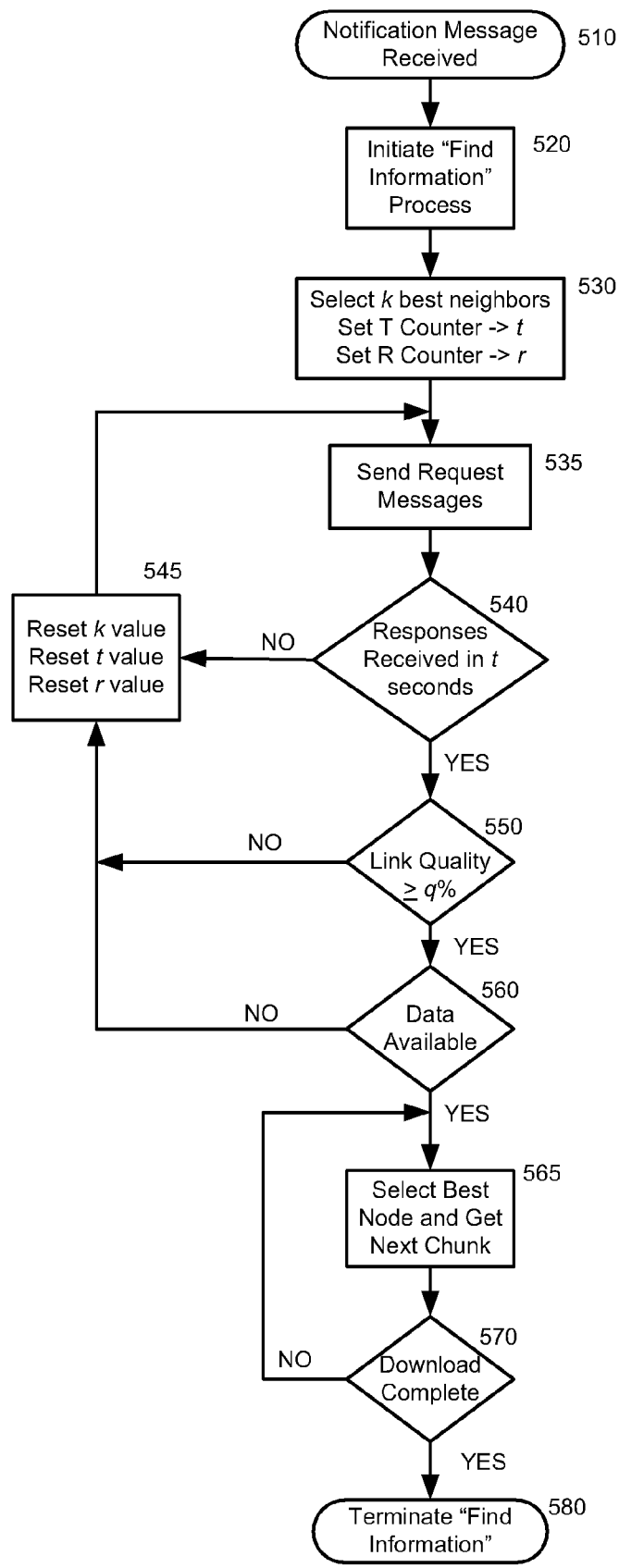
FIG. 5 is a flowchart of a procedure for retrieving the information from a seed node.

An exemplary embodiment of the procedure for information search and acquisition by the network nodes, during the second phase of the image distribution technique, is provided in FIG. 5.

The information search process may proceed along the following steps illustrated in the Figure:

Step 510: A network node receives a notification message from the BOS, informing the node of data to be retrieved.

Step 520: The node initiates a "Find Information" process.

Step 530: The Find Information causes the node to select an established number, k, of its best neighbors, based upon a suitable metric. This metric could be the quality of the links that the node has with its neighbor nodes. Other possible metrics include the amount of traffic being handled by the neighbor node (to avoid selecting one that is an upstream router), nodes that have been employed in the past for the same purpose, nodes that have been active for a certain minimum period of time, etc. The Find Information process also sets a message response time counter to t seconds, and sets a message repeat counter to r seconds. These are configurable values and can be reset at any time during the search process. The node then sends out information request messages to the selected nodes at step 535.

Step 540: The node's message counter tracks the received messages to see if response messages were received within the response time of t seconds, for each of a set of messages that are repeated at an interval of r seconds. If the answer to whether any messages were received within t seconds is NO, the process jumps to step 545.

Step 545: In this step, the threshold counters are reset. The value k, for the number of nodes to be queried, is increased (for instance, the number can be doubled). The message response time counter is either increased or kept at the same value of t seconds. The message repeat counter's threshold value r is reduced (typically by one-half). The search is then resumed at step 535, with the new nodes and threshold values.

Step 550: If the answer is YES in Step 540, the process moves on to step 550. The process checks to see if the nodes that respond to the information requests meet a configurable threshold link quality of q %. If the answer is NO, the search process reverts to step 545 to further expand the search. If the answer is YES, the procedure moves to step 560.

Step 560: The process inquires of the positively responding nodes whether they have the image available for download. If the answer is YES from one or more responding nodes, the process moves to Step 565. If the answer is NO, the process reverts to Step 535 to continue with a further expanded search.

Step 565: The process selects the best node among the responding nodes that have the image available for download. Once the information has been found on a neighbor, the node acquiring the information pulls the information from its neighbor in chunks. The rate at which the acquiring node gets chunks of data from its neighbor, and the chunk size, may be varied according to the link quality between the two nodes and the perceived network traffic in the area. For example, if there are a lot of collisions at the MAC layer of the network interface, the node may slow down acquiring the image. In one embodiment, the node may send query for an X byte chunk of the information at offset Y. The node waits a determined period of time, e.g. 2 seconds, between downloading each chunk.

Step 570: When the node receives the requested information or after a timeout, the process checks to see if the download is complete. If the answer is NO for whatever reason (outage, link failure, other), the process reverts back to Step 565 to select a new node or the same node, and resume downloading. Since previously downloaded information is already stored in the node, the download resumes from the last successfully received chunk. If the answer is YES, the process moves to Step 580.

Step 580: The node checks to make sure it has downloaded the announced information and terminates the Find Information process.

While the information download steps described with reference to FIG. 5 are representative of one embodiment, other variations of the embodiment are possible. For example, in another embodiment, the requesting node may first target its query to an initial set of neighbors (or to an expanded set if the initial set fails to provide a positive response), to first determine which neighbor nodes have the image and then pick the nodes that meet the link quality threshold.

The search is implemented differently in different types of networks. In one embodiment where the network is based on frequency hopping spread spectrum (FHSS) techniques, seed nodes with the image may separately transmit the image to each requesting neighbor or respective channels. Alternatively, it may be possible to add MAC support to synchronize nodes to one channel.

In FHSS-based networks, a node may recognize that it is transmitting an image to several neighbors. It may create a "broadcast" hopping sequence and a designated timing, and transmit the image. The interested neighbors can then tune in to the appropriate frequencies at the requisite times and receive one or more packets containing the image during each frequency's time slot. In some embodiments, an error threshold may be established to detect and implement when a node should switch over to a unicast mode if it is not successfully receiving all of the data chunks. The missing chunks are then retransmitted to neighbors that could not receive the complete broadcast image.

The link quality criteria used to filter the neighbor nodes to improve reliability of download of the image may be based on a metric of successful packet reception rate statistics between the two neighbors, the target node's traffic congestion history, and a related set of factors that provide an overall measure of the reliability probability of receiving information packets of certain size and duration.

The "chunk" procedure for downloading an image or a file may be a flexible procedure depending upon the file size of the image (in bytes), the overall packet traffic density among the neighborhood nodes, and the link condition threshold sensed by the requesting node. In one embodiment, if the average link quality is well above a defined threshold, the packet traffic density is average, and the file size is moderate (about a few hundred kilobytes), then the requesting nodes may configure the download request such that it receives the entire file in no more than 3 chunks. In other embodiments, the chunk size may be no more than 40 or 50 kilobytes. The historical record of previous downloads in terms of successful chunk sizes may be used to adjust the chunk size. In some embodiments, where the sending nodes use a beaconing method to distribute an image file, those nodes may collect and establish the average link quality of all the nodes that may have requested the download, in order to select the chunk size of the image file. Thus, the chunk size may be established so that all requesting nodes have the maximum probability of receiving the chunk, thereby alleviating the need for repeat downloads.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A method of disseminating information from a central location to nodes in a network, comprising:
   selecting a node in the network as a seed node and transferring the information to the seed node for storage therein;
   sending a notification message from the central location to non-seed nodes in the network, informing them of the availability of said information for download from one or more seed nodes;
   from each non-seed node in the network that is to receive the information, sending an information transfer request to an established number of neighbor nodes;
   in the event the information is not located at one of said neighbor nodes in response to the transfer request sent to the established number of neighbor nodes after a defined wait interval, sending an information transfer request to a successively increasing number of neighbor nodes, until either the information is located at a neighbor node or a search threshold is reached; and
   in the event the information is located, downloading the information from a neighbor node.

2. The method of claim 1, wherein the established number of neighbor nodes is determined on the basis of a metric.

3. The method of claim 2, wherein said metric is related to the quality of a connection to a neighbor node.

4. The method of claim 2, wherein said metric is related to the amount of traffic being handled by the neighbor node.

5. The method of claim 1, wherein the step of increasing the set of neighbor nodes that are sent the transfer request occurs after a plurality of said transfer requests are repeatedly sent a predetermined number of times to said established number of neighbor nodes.

6. The method of claim 1, further including the step of increasing the wait interval in conjunction with increasing the set of neighbor nodes that are sent the transfer request.

7. A method of distributing information to nodes in a network, comprising:
   selecting a node in the network as a seed node and storing the information in the seed node;
   notifying all non-seed nodes in the network of the availability of said information for download from one or more seed nodes;
   from each non-seed node in the network that is to receive the information, sending an information transfer request to an established number of neighbor nodes;
   in the event the information is not located at one of said neighbor nodes in response to the transfer request sent to the established number of neighbor nodes after a defined wait interval, sending an information transfer request to a successively increasing number of neighbor nodes, until either the information is located at a neighbor node or a search threshold is reached;
   in the event the information is located, determining whether the link quality to the node with the information is above a link quality threshold;
   downloading the information if the link quality is above the link quality threshold; and
   continuing to transmit requests for the information in the event the link quality is not above the link quality threshold.

8. A method of disseminating information from a central location to nodes in a network, comprising:
   selecting a node for seeding by:
     selecting a candidate node from a list of nodes in the network;
     if the selected candidate node has less than a first preset threshold of other nodes which route through the selected candidate node to an access point of the network, and
     if the selected candidate node has more than a second preset threshold of neighbor nodes with a link quality above a preset link quality threshold, designating the selected candidate node as a node for receiving a seed of the information;

transferring the information from the central location to the designated node in the network for storage therein;

sending a message from the central location to other nodes in the network, informing them of the availability of new information;

sending an information transfer request from each of said other nodes to a plurality of neighbor nodes to locate the information; and in the event the information is located, downloading the information to the requesting node.

9. The method of claim 8, further including the step of determining whether the selected candidate node has a traffic congestion level less than an established value, and designating the selected candidate node as a node for receiving a seed only if the traffic congestion level is less than said established value.

10. The method of claim 8, wherein said steps of selecting a node for seeding are performed for a plurality of candidate nodes, until a predetermined percentage of all nodes that are to receive the information have been designated as nodes for receiving a seed of the information.

11. A method of distributing information in a network, comprising:

selecting a node for seeding by:
  selecting a candidate node from a list of nodes in the network;
  if the selected candidate node has less than a first preset threshold of other nodes which route through the selected candidate node to an access point of the network, and
  if the selected candidate node has more than a second preset threshold of neighbor nodes with a link quality above a present link quality threshold, designating the selected candidate node as a node for receiving a seed of the information;

storing the information at the designated node in the network;

informing other nodes in the network of the availability of new information;

sending an information transfer request from each of said other nodes to a plurality of neighbor nodes to locate the information;

in the event the information is located, downloading the information to the requesting node; and in the event the information is not located in response to the transfer request sent to said plurality of neighbor nodes after a defined wait interval, sending an information transfer request to a successively increasing set of neighbor nodes, until either the information is located at a neighbor node or a search threshold is reached.

12. A method of disseminating information from a central location to nodes in a network, comprising:

selecting at least one node in the network as a seed node and transferring the information from the central location to the seed node for storage therein;

from each of a plurality of other nodes, sending an information transfer request to a plurality of neighbor nodes to locate the information; and in the event the information is located, downloading the information by:
  sending a request for a portion of the information starting at an established offset value,
  downloading the requested information portion,
  waiting a predefined period of time after receipt of the requested information portion before sending a request for an additional portion of the information.

13. A method of distributing information in a network, comprising:

selecting at least one node in the network as a seed node and storing the information in the seed node;

from each of a plurality of other nodes, sending an information transfer request to a plurality of neighbor nodes to locate the information;

sending a synchronization message to a plurality of nodes requesting the information, the synchronization message specifying a given channel in a frequency hopping spread spectrum network via which the information is to be transmitted from a given seed node;

receiving, at a plurality of requesting nodes tuned to said given channel, a packet containing the requested information portion; and downloading the information by:
  sending a request for a portion of the information starting at an established offset value,
  downloading the requested information portion,
  waiting a predefined period of time after receipt of the requested information portion before sending a request for an additional portion of the information.

* * * * *